US008230348B2

(12) United States Patent    (10) Patent No.: US 8,230,348 B2
Peters et al.    (45) Date of Patent: Jul. 24, 2012

(54) COLLABORATION SOFTWARE WITH REAL-TIME SYNCHRONIZATION

(75) Inventors: Roger Peters, Bloomington, MN (US); Judah Himango, Savage, MN (US); Jerry Backer, Coon Rapids, MN (US); Christopher Clennon, Columbia Heights, MN (US)

(73) Assignee: Roger Peters, Bloomington, MN (US)

( * ) Notice: Subject to any disclaimer, the term of this patent is extended or adjusted under 35 U.S.C. 154(b) by 1032 days.

(21) Appl. No.: 12/111,194

(22) Filed: Apr. 28, 2008

(65) Prior Publication Data

US 2009/0271708 A1    Oct. 29, 2009

(51) Int. Cl.
*G06F 3/00* (2006.01)
(52) U.S. Cl. ........ 715/738; 715/751; 715/810; 707/828; 707/829
(58) Field of Classification Search ................ 715/738
See application file for complete search history.

(56) References Cited

U.S. PATENT DOCUMENTS

| | | | |
|---|---|---|---|
| 5,812,983 A | 9/1998 | Kumagai | |
| 6,240,414 B1 * | 5/2001 | Beizer et al. ........................ | 1/1 |
| 6,308,173 B1 * | 10/2001 | Glasser et al. ..................... | 1/1 |
| 6,446,113 B1 | 9/2002 | Ozzie et al. | |
| 6,640,241 B1 | 10/2003 | Ozzie et al. | |
| 6,993,539 B2 * | 1/2006 | Federwisch et al. ............... | 1/1 |
| 7,181,480 B1 * | 2/2007 | Nikiel et al. ....................... | 1/1 |
| 7,668,922 B2 * | 2/2010 | Garbow et al. ............. | 709/207 |
| 7,877,327 B2 * | 1/2011 | Gwiazda et al. ............. | 705/52 |
| 7,949,770 B2 * | 5/2011 | Kawabata et al. ........... | 709/229 |
| 2003/0231413 A1 | 12/2003 | Howard | |
| 2004/0177319 A1 * | 9/2004 | Horn ........................... | 715/501.1 |
| 2004/0199514 A1 * | 10/2004 | Rosenblatt et al. ............. | 707/10 |
| 2005/0091359 A1 | 4/2005 | Soin et al. | |
| 2005/0216556 A1 | 9/2005 | Manion et al. | |
| 2005/0246544 A1 | 11/2005 | Moore et al. | |
| 2005/0278392 A1 | 12/2005 | Hansen et al. | |
| 2005/0278458 A1 | 12/2005 | Berger et al. | |
| 2006/0004794 A1 | 1/2006 | Pizzo et al. | |
| 2006/0069605 A1 | 3/2006 | Hatoun | |
| 2006/0080363 A1 | 4/2006 | Vadlamani et al. | |
| 2009/0070291 A1 * | 3/2009 | Tadayon et al. ................... | 707/2 |

OTHER PUBLICATIONS

Ozzie, Ray et al., Communication, Collaboration & Technology: Back to the Future, 2003, 22 pages, Groove Networks, Inc.

* cited by examiner

*Primary Examiner* — Alvin Tan
(74) *Attorney, Agent, or Firm* — Shewchuk IP Services, LLC; Jeffrey D. Shewchuk

(57) ABSTRACT

A collaboration program operates on a computer system for storing, sharing and synchronizing data between different users. Centrally stored content data items are organized by associations into one or more folders, with the folders arranged by associations in a multi-level hierarchical structure. Users have access to all folders and content data items falling within at least one top level folder or "file cabinet" viewable by that user. When a user makes a change/addition to the hierarchical structure, that change/addition is transmitted to a server, which makes the change/addition to the necessary associations and sends messages through a TCP/IP format advising other signed-on users of the change/addition. With each content data item having the capability of being associated into multiple folders and each folder having the capability of being associated into multiple other folders or file cabinets, the computer system operating the collaboration program gives different users simultaneous, synchronized access to the folders and content data items in the hierarchical structure.

23 Claims, 7 Drawing Sheets

COLLABORATION SOFTWARE WITH REAL-TIME SYNCHRONIZATION

CROSS-REFERENCE TO RELATED APPLICATION(S)

None.

BACKGROUND OF THE INVENTION

The present invention relates to software, and particularly to software systems used between multiple individuals, likely at different locations, to enable the various individuals to collaborate more effectively than possible with present software programs and systems.

One troubling software issue of today involves collaboration between various users of information who are functioning together as a team. In many business environments, each collaborator is linked to other collaborators in only a subset of the projects that that collaborator is working on or has worked on previously. At any given time, any individual may collaborate with another individual on no projects, on only one project, or on many projects. Each individual also carries his or her own history of projects worked on in the past, much of which might be irrelevant noise to other collaborators with different historical backgrounds. Each collaborator accordingly carries his or her own emphasis and interests for each project, and may have a desired organizational structure for information which is slightly different or quite different from other collaborators.

Some collaboration software addresses these concerns through replication of information, copying information so each collaborator can have his or her own copy, which that collaborator can organize according to individual desires. However, replication and storage of the volumes of information handled in today's digital world is time consuming and costly, and the replication volume can often overwhelm the volume of original, new information. If one collaborator makes changes to the replicated information, such changes do not affect the information stored at an earlier time by another collaborator, and proper replication and storage of each change quickly becomes an impossible task.

Other collaboration software uses a single repository for original information, for which each collaborator is given access. Then if any collaborator makes a change, the other collaborators see that change the next time they access the information. However, usually when multiple collaborators have access and are able to make changes, all of the collaborators must share the same organizational structure for the information. A Wiki is a well known version of a collaboration database which gives broad access and change rights, but in which all users share the same organizational structure for the data.

Still other collaboration software involves distributed sources or distributed databases. Multiple storage sources exist, which are linked together for viewing purposes. While broad access is given, only the "owner" or "original poster" of the information has the right to make changes to the items so stored. The world wide web is an example of a system where only the "owner" of the information can make changes, but the information posted can be widely viewed.

New collaboration software is needed which permits multiple users to each have change rights to the underlying information, while simultaneously permitting changes to the organizational structure for the information which do not require sharing, such that different collaborators may have different organizational structures for the information but still have access and change rights to a single version of the information. The collaboration software should provide users with the option of working at remote locations. The collaboration software should also permit easy and seamless sharing of information and groups of information as intuitively as possible with the simplest command requirements possible, with such sharing occurring essentially instantaneously when the sharing commands are given.

BRIEF SUMMARY OF THE INVENTION

The present invention is a collaboration program operating on a computer system for storing, sharing and synchronization of data between different users. Content data items are electronically stored in a central memory. The content data items are organized by associations into one or more folders, with the folders arranged in a multi-level hierarchical structure. When a user makes a change/addition to the hierarchical structure, that change/addition is transmitted to a server, which makes the change/addition to the necessary associations and sends messages through a TCP/IP format advising other signed-on users of the change/addition. The server allows users to access all folders falling within at least one top level folder with access granted to that user. With each content data item having the capability of being associated into multiple folders, and with each folder having the capability of being associated into other folders, the computer system operating the collaboration program gives different users simultaneous, synchronized access to the same content data through different folders in the hierarchical structure.

While the above-identified drawing figures set forth preferred embodiments, other embodiments of the present invention are also contemplated, some of which are noted in the discussion. In particular, the drawings and the examples of the description are greatly simplified in comparison to a real-life implementation. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

The invention involves a collaboration software program, and the methods and data structures used in the collaboration software program. As will be explained, the collaboration software program of the present invention organizes information to the best organization and use of each of the collaborators using the program. The collaboration software program can be readily implemented in any of a wide variety of known operating systems, such as in a WINDOWS, MACINTOSH, LINUX or other operating system environment.

Figure 1:
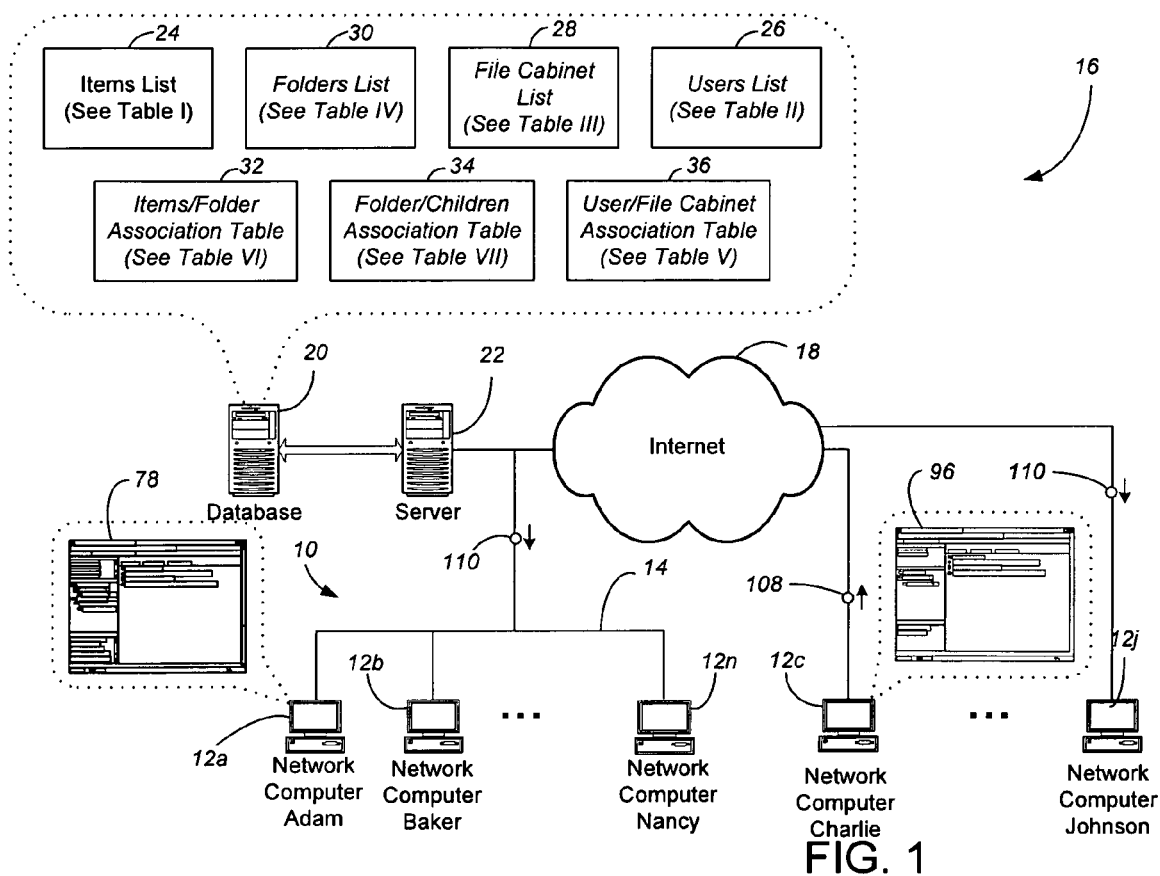
FIG. 1 is a schematic view of an example computer system utilizing the collaboration software of the present invention.

As shown in FIG. 1, the collaboration software is utilized in a network 10 of computers 12 or viewers of different users. The computers 12 for each user will most commonly be personal computers of the types commonly used today, though the collaboration software could be easily used with a mainframe setup and simple terminals, with handheld units (including PDAs or cell phones), or any of a wide variety of other hardware configurations storing the software as recorded executable instructions on a non-transitory, tangible computer readable storage medium, and the terms "computers" or "viewers" should not be construed to be limited to personal computers. Some of the users may be present at a single location, and may have a wired or wireless connection 14 between their computers 12. Other users may connect to the system 16 remotely, such as over the internet 18.

Items of computer information which are desired to be shared on the system 16 are primarily stored on a central computer system, such as a database storage computer 20. The database computer 20 communicates such as through a server 22 to any of a number of user computers 12 which are all peripheral to the database computer 20. As known in the art of computer databases, the database storage computer 20 can be part of the server 22 or can be a physically separate computer communicating with the server 22. The term "server" is accordingly used for the computerized function of controlling electronic communication on the network 10, while the term "database" refers to the software/hardware storage structure for information being shared. As understood in the art, the present invention preferably includes server-side software as well as user computer software or client-side software.

At a basic level, each piece of content data information to be shared in the collaboration software exists as an item in a server-side database, such as a simplified Items List 24 showing a portion populated with several example values shown below in Table I.

TABLE I

Items List

| Item ID | Value of Content Data for Item | Item Type |
|---|---|---|
| 1 | A place for text sentences typed into the system . . . | text |
| 2 | http:\\www.bsi1.com/index | URL |
| 3 | Received: from mail.seemywebpage.com ([218.206.97.251 . . . | e-mail |
| * * * | * * * | * * * |
| 57213 | c:\peterscv.doc | file |
| 57214 | c:\petersmug.jpg | file |
| 57215 | BEGIN: CONTACT; N: Peters; Roger; ORG: Judah Software, Inc. TEL; WORK; VOICE: (952) 888-7000 . . . | contact |
| * * * | * * * | * * * |
| N | value for item n | type of item n |

The Items List 24 resides on the central computer system, such as the database storage computer 20. As shown by the example item IDs, there can be a significantly large number of informational items being handled by the system 16 representing stored content data. The term "content data", as used herein, refers to the data which primarily derives its value from user input, in contrast to address data, statistical data or other data which is primarily computer generated. Any of the users with access given through the collaboration software can view or change the content data in the Items List 24 under the control of the server 22. Items of content data in the Items List 24 can preferably be any of numerous different types, and the Items List 24 preferably stores the content data itself as well as an identifier of the type of information represented. As a first example, items can include text items, wherein the content data is basically represented as a stream of unicode characters of arbitrary length. Workers skilled in the art will recognize that there are many equivalent ways to represent and store such text entries. By using a basic format for text items, the content data of the text items can be easily created directly within the application program, and can be easily transmitted, stored and used in the system 16 of the present invention as well as in numerous other programs. Alternatively, a proprietary format for creating and/or storing text items can be used.

As a second example, items can include URLs, in which the content data identifies a website or webpage on the world wide web of the internet 18. Again, workers skilled in the art will recognize that there are many equivalent ways to represent and store URL entries, but the preferred method merely includes a text entry designated as a URL. A default content data value for the text entry is the world wide web text address of the webpage. Alternatively or in conjunction with the text address, the system 16 may allow a user to type an alias for the webpage, similar to most "favorites" as stored on common browsers. The number address information for the URL or webpage within that URL need not be independently stored, but rather may be resolved in the browser program being used by that particular user. Alternatively, address information, cache information, or any of the other information used in known browser applications may be stored within the Items List 24. However, simplifying the information stored in the Items List 24 associated with each URL item permits users to rely on their own (often different between users) browsers with minimum compatibility problems.

As a third example, items can include e-mails. As understood by workers skilled in the art, each e-mail includes addressing information and content data text information in a TCP/IP packetized format acceptable for transmission over the internet 18 in known ways.

As a fourth example, items can include address information for a file, or the data of the file itself. One example of a file is a .doc file, commonly recognized as a document created and/or readable in MICROSOFT WORD. Another example of a file is a .jpg file, a commonly recognized file type for storing images or pictures. Numerous other similar file types exist, for documents, images, songs, movies, etc. The Items List 24 can store either an address for such files or the file itself. The present invention is intended to work in conjunction (not in substitution) with software programs commonly marketed for reading, creating, storing and printing such files. For instance, with a c:\peterscv.doc file shown as an example, any particular user on the system 16 will need a version of MICROSOFT WORD or another viewer for .doc files in order to read and use the peterscv.doc file.

As a fifth example, items can include contact items. Contact items are well known in numerous computer programs, storing content data information such as name, address and phone number information for individuals or entities in an organized format. Another type of item which could be included is a calendar or scheduling item.

Workers skilled in the art will readily be able to identify other types of content data information which can be stored as items and used in the collaboration program of the present invention. Similarly, other types of content data information in formats which will exist in the future can be readily adapted to be items in the Items List 24.

Each item of content data information used by the program is assigned a unique item ID. In this example, item IDs are assigned sequentially as each item is created and/or placed within the program. Other types of identification schemes can be equally used. The example shows values that are numerical, but any format of identifying information can be used. The only criticality to items in the Items List 24 is that they are identified as a particular type of content data item and they are assigned a unique identifier for subsequent use in the collaboration software. Workers skilled in the art will also recognize that computer information is commonly stored with unique addressing identifiers, and that the storage of items can be done in accordance with any data storage/retrieval methods.

A significant feature of the present invention is the way in which content data from the items are organized and presented to individual users, which in a preferred embodiment involves the identification of users, file cabinets and folders. Because the present invention is primarily intended for use by multiple users from various, possibly remote locations, the collaboration software includes a Users List 26, which is preferably stored on the server 22 for ease of access by the server 22. The Users List 26 preferably assigns unique IDs to each user, which can be done in accordance with any known method of assigning user access known in the art. For this simplified example, user IDs may be assigned sequentially by a system administrator or by the server-side software, resulting in the example Users List 26 having a portion shown below in Table II:

TABLE II

Users List

| User ID | User Value |
|---|---|
| 1 | Adam |
| 2 | Baker |
| 3 | Charlie |
| * * * | * * * |
| 12 | John |
| * * * | * * * |
| 14 | Nancy |
| * * * | * * * |
| n | name value for user n |

The system administrator or server-side software may grant each user access to the Items List 24 through a sign-in procedure. Sign-in, password protection and similar safeguards for the handshaking and identity verification of different users are well known in the art. If desired, the Items List 24 may include additional fields to identify the user who created the content data of the item and the time it was created, the user who last modified the content data of the item and the time it was last modified, or even a complete log of every user who has accessed or modified a particular item.

The top level organizational compartment used in the present invention can be referred to as a "file cabinet". The preferred embodiment automatically assigns a different "My File Cabinet" to each different added user. Each user is subsequently free to create additional file cabinets. Each file cabinet is given an identification number in addition to its name value, which can be assigned in any manner by the server-side software, such as sequentially based upon order of creation. An example showing a portion of the File Cabinet List 28 may accordingly look as follows:

TABLE III

File Cabinet List

| File Cabinet ID | File Cabinet Value |
|---|---|
| 1 | [User 1] My File Cabinet |
| 2 | Work File Cabinet |
| 3 | Fishing File Cabinet |
| 4 | [User 2] My File Cabinet |
| * * * | * * * |
| 12 | [User 3] My File Cabinet |
| 13 | School |
| * * * | * * * |
| 21 | Kid's Sports |
| * * * | * * * |
| 52 | Cancer Walk |
| * * * | * * * |
| n | Name value for file cabinet n |

As will be further describe below, access to content data items occurs at the file cabinet level. Each user can be assigned to have access to one or more file cabinets as each file cabinet is created in the system 16.

Mid-level organization is obtained in the present invention through a compartment referred to as a "folder". Each folder resides within at least one file cabinet, and is given a unique identifier by the server-side software, which is assigned sequentially in this simple example. In the preferred embodiment, content data items can only exist within at least one folder, and folders can exist within at least one file cabinet. Folders can contain any number of other folders as well as any number of items. An example showing a portion of a Folders List 30 is provided in TABLE IV below:

TABLE IV

Folders List A

| Folder ID | Folder Value |
|---|---|
| 1 | Project Alpha |
| 2 | Subproject Beta |
| 3 | Lake Huron Trip |
| 4 | Subproject Gamma |
| * * * | * * * |
| 17 | Insurance |
| * * * | * * * |
| 40 | Project Nu |
| 41 | Subproject Omicron |
| 42 | Subproject Pi |
| * * * | * * * |
| n | Name value for folder n |

The File Cabinet List 28 and the Folders List 30 preferably reside on the database computer 20, but could also or alternatively reside on the server 22.

The organizational aspect of the collaboration software is preferably achieved through association tables to link between these various lists of content data items, users, file cabinets and folders. Examples showing portions of these association tables are provided in TABLES V-VII below:

TABLE V

User/File Cabinet Association Table

| Key | User ID | File Cabinet | Index | OLF |
|---|---|---|---|---|
| 1 | 1 | 1 | 0 | 0 |
| 41 | 1 | 2 | 1 | 0 |
| 24 | 1 | 3 | 2 | 0 |
| 527 | 1 | 52 | 3 | 0 |

TABLE V-continued

User/File Cabinet Association Table

| Key | User ID | File Cabinet | Index | OLF |
|---|---|---|---|---|
| 98 | 1 | 4 | 4 | 0 |
| 512 | 1 | 12 | 5 | 0 |
| * * * | * * * | * * * | * * * | * * * |
| 1433 | 1 | 27 | 12 | 0 |
| * * * | * * * | * * * | * * * | * * * |
| 97 | 2 | 4 | 0 | 0 |
| 123 | 2 | 2 | 1 | 0 |
| * * * | * * * | * * * | * * * | * * * |
| 511 | 3 | 12 | 0 | 0 |
| 521 | 3 | 52 | 1 | 0 |
| 714 | 3 | 13 | 2 | 0 |
| * * * | * * * | * * * | * * * | * * * |
| 1432 | 12 | 27 | 0 | 0 |
| 1475 | 12 | 2 | 1 | 0 |
| * * * | * * * | * * * | * * * | * * * |

As shown in the example represented in Table V, Adam (the supervisor for this example) has access to Adam's File Cabinet, as well as to the Work File Cabinet and the Fishing File Cabinet he created. Adam also has access to Baker's File Cabinet, to Charlie's File Cabinet, and to the file cabinets of the other supervised employees, including John and Nancy (not shown). Baker has access to Baker's File Cabinet, as well as to the Work File Cabinet. Charlie has access to Charlie's File Cabinet, as well as to the Work File Cabinet. Charlie also created the Cancer Walk File Cabinet, to which he gave Adam access. John has access to John's File Cabinet, as well as to the Fishing File Cabinet. Other users similarly have access to one or more file cabinets, with such access being given in the User/File Cabinet Association Table 32.

In one preferred embodiment, three further identifying fields are used in addition to the fields correlating which users have access to which file cabinet. The "key" field is a uniquely assigned identifier, which can be used in sorting and searching while performing such operations on the User/File Cabinet Association Table 32. Like the ID fields discussed in this example, the key fields are shown as numeric values for simplicity, but any format of identifying search/sort information can be used. The "index" field is used, for each particular user, to count the number of file cabinets to which that user has access, and to order or arrange the display of the file cabinets on the client-side graphical user interface ("GUI"). The "OLF", or optimistic lock field, is a binary field which can be used to restrict multiple users from simultaneously editing or changing a user/file cabinet association. Workers skilled in the art will appreciate that, while performing the primary role of associating which users have access to which file cabinets, additional fields such as the key, index and OLF fields can be used as desired for performing various functions on the database. Workers skilled in the art will appreciate that the correlations made in the users/file cabinet association table could be either added integrally into the File Cabinet List 28 or into the Users List 26.

A portion of a simple Items/Folder Association Table 34 is shown in Table VI:

TABLE VI

Items/Folder Association Table

| Key | Folder ID | Item ID | Index | OLF |
|---|---|---|---|---|
| * * * | * * * | * * * | * * * | * * * |
| 423 | 2 | 1 | 0 | 0 |

TABLE VI-continued

Items/Folder Association Table

| Key | Folder ID | Item ID | Index | OLF |
|---|---|---|---|---|
| 522 | 2 | 2 | 1 | 0 |
| 734 | 2 | 3 | 2 | 0 |
| * * * | * * * | * * * | * * * | * * * |
| 384743 | 40 | 57213 | 0 | 0 |
| 384745 | 41 | 57215 | 0 | 0 |
| 429832 | 42 | 2 | 0 | 0 |
| 862484 | 42 | 91322 | 2 | 0 |
| * * * | * * * | * * * | * * * | * * * |

In addition to associations between a folder and each item in the folder, the key, index and OLF fields can be used as discussed above for the User/File Cabinet Association Table 32. Workers skilled in the art will appreciate that the correlations made in the Items/Folder Association Table 34 could be either added integrally into the Items List 24 or into the Folders List 30. However, providing the association table 34 separate from each of the lists 24, 30 permits a simple implementation wherein the associations, having no values displayed to the user, are stored separately from the Items List 24 and the Folders List 30, each of which have content data values displayed to the user.

A simple Folder/Children Association Table 36 is shown in TABLE VII.

TABLE VII

Folder/Children Association Table

| Key | File Cab/Folder ID | Child ID | Index | OLF |
|---|---|---|---|---|
| 423 | FC1 | 2 | 0 | 0 |
| 59342 | FC1 | 40 | 1 | 0 |
| 49234 | FC2 | 1 | 0 | 0 |
| 87613 | FC2 | 40 | 1 | 0 |
| 1174 | FC3 | 3 | 0 | 0 |
| * * * | * * * | * * * | * * * | * * * |
| 49265 | FC12 | 17 | 0 | 0 |
| * * * | * * * | * * * | * * * | * * * |
| 5234 | 1 | 2 | 0 | 1 |
| 5246 | 2 | 4 | 0 | 0 |
| * * * | * * * | * * * | * * * | * * * |
| 63452 | 35 | 40 | 0 | 0 |
| 34234 | 35 | 1 | 1 | 0 |
| * * * | * * * | * * * | * * * | * * * |
| 34651 | 40 | 41 | 0 | 0 |
| 73572 | 41 | 42 | 0 | 0 |

Once again, the index is used as a vehicle to order/arrange the display of child folders when the contents of the file cabinet or parent folder are displayed. The key is used for searching and sorting functions, and OLF is used to ensure that multiple users do not simultaneously overwrite different information to the same record in the association table.

Figure 2:
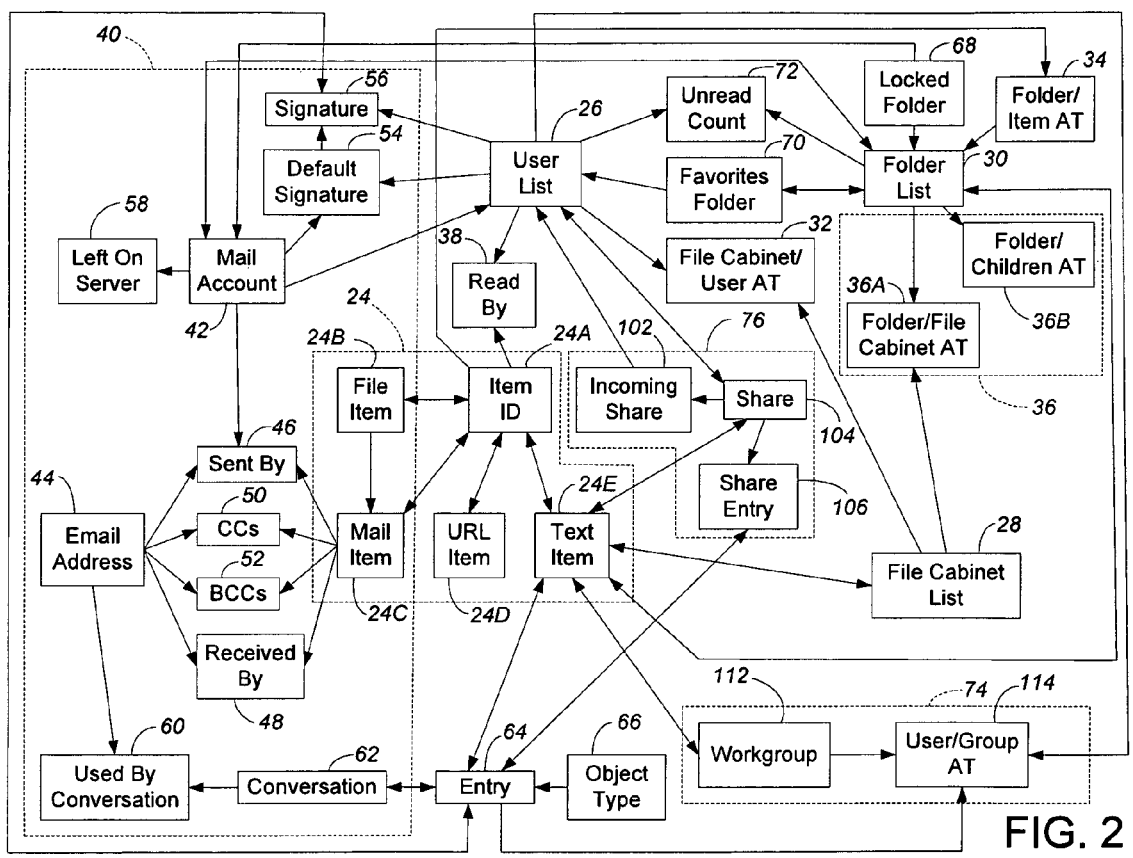
FIG. 2 is a schematic layout of data structures used in a preferred embodiment of the invention.

Real world implementations using the database concepts exemplified by these Tables I-VII can of course be significantly more complex. FIG. 2 represents the data structures used in one particular preferred embodiment. In FIG. 2, each separate datastructure is labeled in accordance with the type of information stored in the datastructure. The lines and arrows between the various datastructures show how the information in one datastructure is linked to information in other data structures: an arrow present on only one end of the linking line indicates which datastructure primarily controls which other datastructures.

As shown in this preferred embodiment, the Items List 24 is broken up into five different lists, largely based upon the type of information contained in the item. A first Item ID list 24A may store the unique identifier field and further link through that unique ID to a File Item list 24B, a Mail Item List 24C, a URL Item list 24D and a Text Item list 24E. The File Item list 24B may, for example, include fields for the ID, for the file name, and for an identification of whether the item is associated with an email item. The Mail Item List 24C may, for example, include the following fields: ID, MailItemState, Header, LastExceptionMessage, MessageId, Subject, SendDate, Sender, Recipient, CC, BCC, MailAccountId, Body, EntireMessage, FailedMailAccount and GCRecord. The URL Item list 24D may include fields for the ID, for the URL, and for the ImageBytes contained in the item. The Text Item list 24E may include fields for the ID, for HTML and for Text values. These five separate datastructures (Item ID list 24A, File Item list 24B, a Mail Item List 24C, a URL Item list 24D, and Text Item list 24E) thus collectively make up the Items List 24 with an example shown in Table I, but with significantly more fields and types of information for particular types of items. Additional or different fields may be provided for each type of item in accordance with the various sharing and collaboration functions being achieved in the system 16. Additional separate datastructures may be added to the Items List 24 as desired to encompass the types of information being handled in the system 16.

The Item ID list 24A is additionally linked through to a ReadBy list 38. The ReadBy list 38 also links into the Users List 26 to provide the cataloging of which items have been read by which users. The preferred ReadBy list 38 contains fields of OID (corresponding exactly to and controlled by the ID of each item in the Item list 24 and each ID of each user in the Users List 26), ItemsReadByUser, UsersWhoHaveRead, and OLF.

As exemplified with Table II, the Users List 26 contains enough information to separately identify each user on the system 16. In the preferred embodiment, the Users List 26 contains fields of: ID, UserName, Password, FirstName, LastName, PasswordChangeRequired, IsAdministrator, LastLoginTime, DefaultMailAccount, Primary FileCabinet, FavoritesFolder, AccountIsDisabled, and GCRecord (GCRecord being a "Garbage Collect" indicator for entries that should not be shown on the user's GUI but rather exist in a "trash bin"). As shown, the Users List 26 is linked through to numerous other datastructures. Workers skilled in the art will thus understand that additional or different fields may be provided for each user in accordance with the various sharing and collaboration functions being achieved in the system 16. Additionally, the preferred embodiment may utilize a single scheme for assigning IDs, such that no User record can have the same value for its ID field as any item or as any of the other ID fields discussed below.

As exemplified with Table III, the File Cabinet List 28 contains enough information to separately identify the various file cabinets in the system 16. The preferred File Cabinet List 28 simply contains an ID field, which is then linked through the Text Items List 24E to provide the values (names) of the various file cabinets, As exemplified with Table IV, the Folders List 30 contains enough information to separately identify the various folders in the system 16. The preferred Folders List 30 simply contains an ID field, which is then linked through the Text Items List 24E to provide the values (names) of the various folders, The association tables 32, 34, 36 are each provided in their own datastructures linked in between the lists that they associate. The preferred User/File Cabinet Association Table 32 includes fields of ID, Index, Folder, User and OLF. The preferred Items/Folder Association Table 34 includes fields of ID, Item, Folder, Index and OLF. The preferred Folder/Children Association Table 36 exists as two different datastructures, a Folder/File Cabinet Association Table 36A and a Folder/Children Association Table 36B. The preferred Folder/File Cabinet Association Table 36A includes fields of ID, Index, Folder, FileCabinet and OLF. The preferred Folder/Children Association Table 36B includes fields of ID, ParentFolder, ChildFolder, Index and OLF.

The preferred system 16 includes a number of datastructures which are part of an email system 40. In addition to the Mail Item list 26C and the File Item list 26B (the files of which may or may not be part of an e-mail), the preferred email system includes a Mail Account list 42 and an Email Address list 44. The Email Address list 44 is linked to the Mail Item list 26C through four common e-mail fields which each reside in separate lists, namely, a Sent By list 46, a Received By list 48, a CC (originally for "carbon copy") list 50, and a BCC (originally for "blind carbon copy") list 52. The Mail Account list 42 is linked with a Default Signature list 54 which is in turn linked with a Signature list 56. Each of the Default Signature list 54 and the Signature list 56 is linked from the Users list 26, and the Users list 26 is also linked to the Mail Account list 42. A Left on Server list 58 is linked to the Mail Account list 42 as well. Two additional lists, the Used By Conversation list 60 and the Conversation list 62, are used to track mail items into particular conversations (i.e., those having a common subject line or those having a common subject substring) which can then be sorted, shared and associated into folders and between users and groups as will be explained. In general terms, the fields which can be involved in each of these email system lists 42, 44, 46, 48, 50, 52, 54, 56, 58, 60, 62 are known to workers skilled in the art of designing email systems. Depending upon the particular functions the email system is to play, fewer or additional lists can be used and fewer or additional fields and links can be used to implement the email system 40.

An Entry list 64 and an Object Type list 66 can be used to keep track of additional characteristics of the information being shared, associated and collaborated on using the system 10. The Entry list 64 can include fields of CreationDate, ModificationDate, ID, OLF and ObjectType. The Entry list 64 can then be linked through to any of the other lists for which it is desired to retain creation date/time and/or modification date/time information. The Object Type dataset 66 can include fields of OID, TypeName and AssemblyName. Additional lists and links can be used to further retain additional system information as desired.

The preferred system 16 includes several further lists for tracking and providing functionality with aspects of folders. A Locked Folder list 68 is linked to each folder and each mail account which may be locked to thereby prevent changes to the data contained therein. The preferred Locked Folder list 68 includes fields of ID, ControllingParent ID, and Locked FolderType. Specifically, the Locked Folder list 68 can be used to give separate users separate write security to different portions of the data. A Favorites Folder list 70 is linked to users within the Users list 26 and to folders or items within the Folders list 30 to track and provide functionality of which folders have been identified as favorites to which users. The preferred Favorites Folder list 70 merely contains ID information to correlate and identify the favorites. An Unread Count list 72 is linked between users and folders, to identify, for each folder, how many items remain unread. The preferred Unread Count list 72 includes fields of Folder, User, Count, ID and OLF.

The preferred system 16 also includes two additional sets of lists for still further functionality, the Grouping lists 74 and the Sharing lists 76. As groups and shares are further explained below as additional functionality which can be implemented using the basic invention, the Grouping lists 74 and the Sharing lists 76 will be further explained later.

Figure 3:
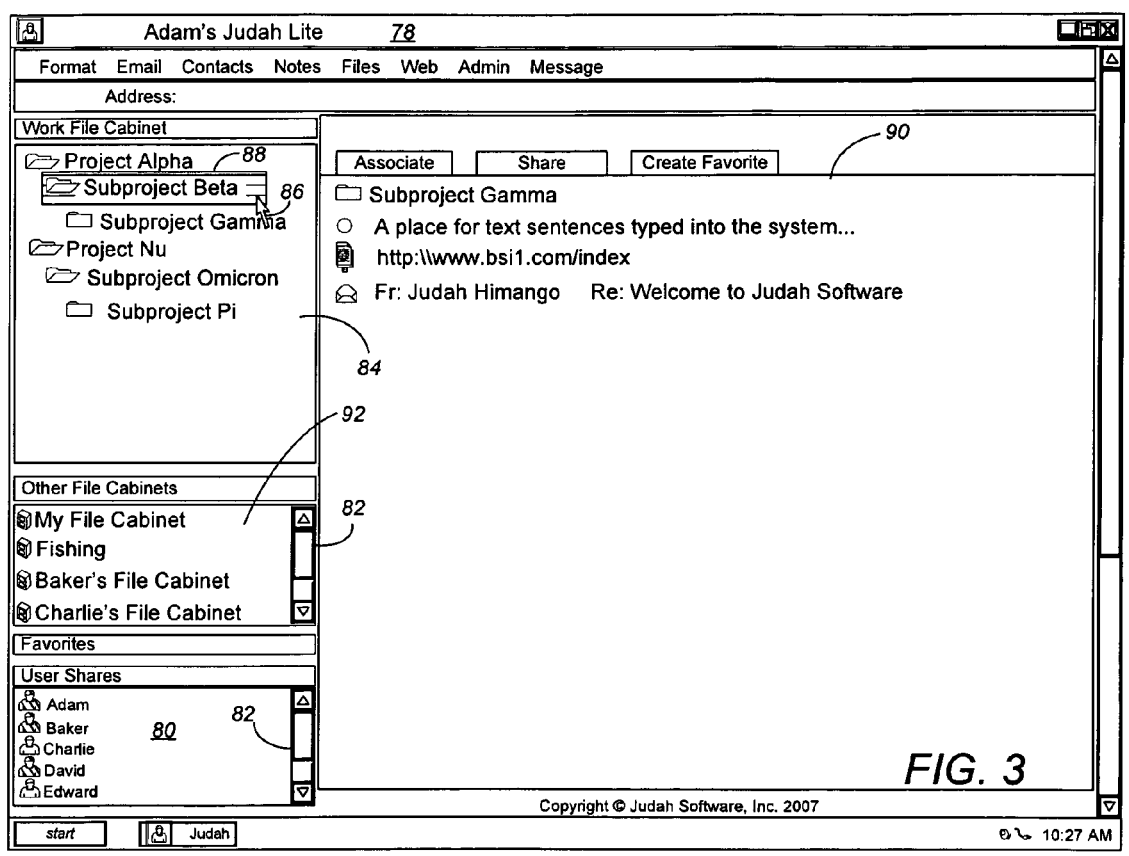
FIG. 3 is a simplified screen shot of a first user (Adam) utilizing the collaboration software of the present invention.

FIG. 3 shows a simplified client-side graphical user interface ("GUI") 78 provided by the collaboration software for a user to work in and display the various file cabinets, folders and items. A first organizational window 80 displays the various users. If desired, highlighting or different icons can be used to show which users are signed on to the system 16. Also if desired, the list of users can be modified or limited, so each person does not know the identities of each person using the system 16. In this instance, the user interface 78 shown is that of the supervisor Adam, reflecting the various users, file cabinets, folders and items to which Adam has access. Thus the users listed in the users' window 80 include all users. If the list of users is longer than the window size, a scroll bar 82 may be provided for scrolling through the list as known in the art.

A second organizational window 84 displays the hierarchical nature of folders in the selected file cabinet, according to which folders have been opened. In this case, Adam has opened the Work File Cabinet. Three folders have been opened in the tree structure of the Work File Cabinet, while a fourth folder "Subproject Pi" remains unopened. If desired, additional windows may be provided or multiple file cabinets may be displayed in the same window 84 so the user can simultaneously see the contents within two or more file cabinets.

The organization and ordering provided by the various index values in the Items/Folder Association Table 34 and the Folder/Children Association Table 36 is evidenced by the listing of folders and items in the second window 84. In this example, Adam's "Work" file cabinet (File Cabinet ID #2) is the displayed file cabinet 84. As shown in the Folder/Children Association Table 36 of Table VII, the "Work" file cabinet contains two folders, entitled "Project Alpha" (Folder ID #1) and "Project Nu" (Folder ID #40). As further shown in the Folder/Children Association Table 36 of Table VII, Project Alpha with an index value of 0 is listed first and Project Nu with an index value of 1 is listed second in the list. Both of these folders are shown as being opened for viewing of any folders contained therein. As shown in the Folder/Children Association Table 36 of Table VII, Project Alpha (Folder ID #1) contains Subproject Beta (Folder ID #2) as a first (and only) child folder, listed with an index of 0. "Subproject Beta" (Folder ID #2) contains "Subproject Gamma" (Folder ID #4) as a separate record in the Folder/Children Association Table 36 of Table VII. Project Nu (Folder ID #40) contains Subproject Omicron (Folder ID #41) as its first (and only) child folder, which in turn contains Subproject Pi (Folder ID #42) as its first (and only) child folder. If any other user has access to and opens the "Work" file cabinet, and then opens each of the "Project Alpha", "Project Beta" and "Project Omicron" folders for viewing, that other user would see the identical display in their second window 84.

Adam has used his mouse 86 to highlight 88 the Subproject Beta, which causes its item contents to be viewable in a primary item window 90. As shown in the Items/Folder Association Table 34 of Table VI, the "Subproject Beta" folder contains three content data items, a text item, a URL item and an e-mail item. Each of these is displayed as a line item in the list of the primary item window 90. If Adam begins a click-drag command with his mouse 86 for possible moving, the OLF for the association between Project Alpha and Subproject Beta is changed to a "dirty" value to reflect that no other user can simultaneously change this association.

A third organizational window 92 displays the file cabinets to which this user has access. Because the user interface shown is that of the supervisor Adam, he has access to his "My File Cabinet", his "Fishing" file cabinet, the "Cancer Walk" file cabinet, and the file cabinets of all the other employees, as well as to the "Work" file cabinet which is opened in the tree display window 84.

The names of people, file cabinets and folders listed in the "User Shares" window 80, the active file cabinet window 84 and the "Other File Cabinets" window 92 are all active HTML fields. The "User Shares" window 80 and the "Other File Cabinets" window 92 can receive any folders or items which are copied or moved by Adam from the Work File Cabinet window 84. The user Adam can associate any of the folders from the Work File Cabinet to any other folder, user or file cabinet, and the default "click-drag-drop" command of the mouse 86 is used to create a new association. Other mouse commands or keystrokes can change the "click-drag-drop" command so as to operate as a move or a copy rather than the default of creating a new association. Similarly, Adam can associate any of the content data items to any of the other folders, users or to any of the other file cabinets. Again other mouse commands or keystrokes can change the "click-drag-drop" command so as to operate as a move or a copy rather than the default of creating a new association. Creating a new association, copying or moving of any of the folders or any of the items does not in any way affect the underlying content data (i.e., does not affect Items List 24), but merely affects the Folder/Children Association Table 36 and/or the Items/Folder Association Table 34. Depending upon where the "drop" of the "click-drag-drop" command takes place, creating a new association, copying or moving can also affect the Sharing lists 76 or the Favorites Folder list 70. Adam can use simple "right-click" commands of a mouse to rename or delete any of the folders or any of the content data items. Adam can similarly create or move other folders or content data items to any of the displayed folders.

Figure 4:
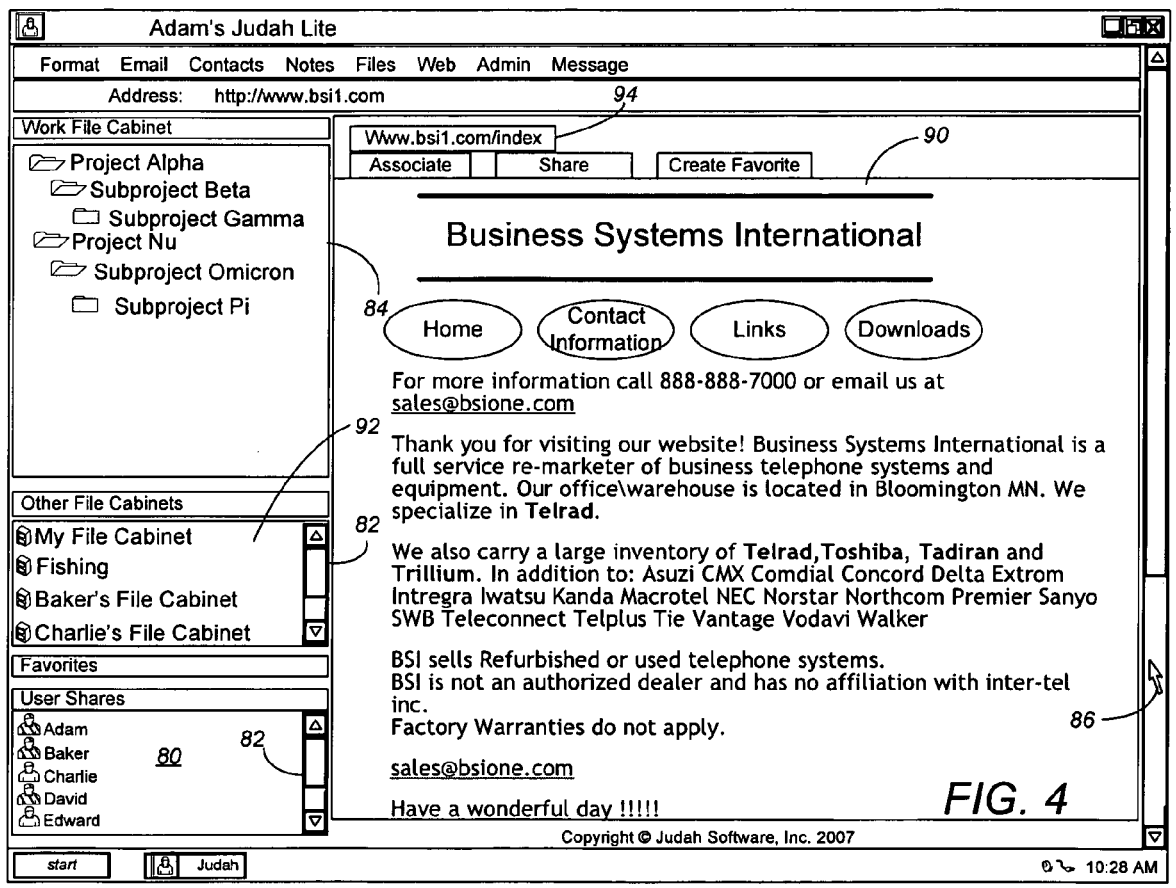
FIG. 4 is a simplified screen shot of the first user (Adam) further utilizing the collaboration software of the present invention.

If Adam wishes to work within any of the content data items, an opening command such a double click of the mouse can be used on the content data item as listed in the primary viewing window 90. For instance, FIG. 4 shows Adam's GUI 78 after he has double clicked on the second content data item. In this example, the second item is a URL, so the primary viewing window 90 opens the computer's browser, downloads from the internet 18 and displays the contents of the requested webpage. The primary viewing window 90 can be used for running any software programs resident on Adam's computer 12, in accordance with the type of item which is opened. A tab 94 on the top of the primary viewing window 90 for the opened item is an active HTML area which allows Adam to create new associations for a content data item even while that item is opened in its software program.

The power associated with the collaboration software of the present invention is thus achieved in the way folders and content data items are associated and in the way items are displayed in the tree structure windows 80, 84, 92 for the various file cabinets and users. If Adam wishes to rearrange items in the "Work" file cabinet, he can simply use his mouse 86 to drag and drop an item to the desired location. The Items/Folder Association Table 34 is rewritten by the server-side software to reflect the change made. As importantly, the change will be reflected in every other user's view of the "Work" file cabinet. If Adam wishes to create a new association for an item from the "Work" file cabinet to any other folder, user or file cabinet, Adam can simply use his mouse 86 to drag and drop the item. If the item being copied is a folder, then the Folder/Children Association Table 36 is updated so as to reflect an additional child for all the nested folders.

Figure 5:
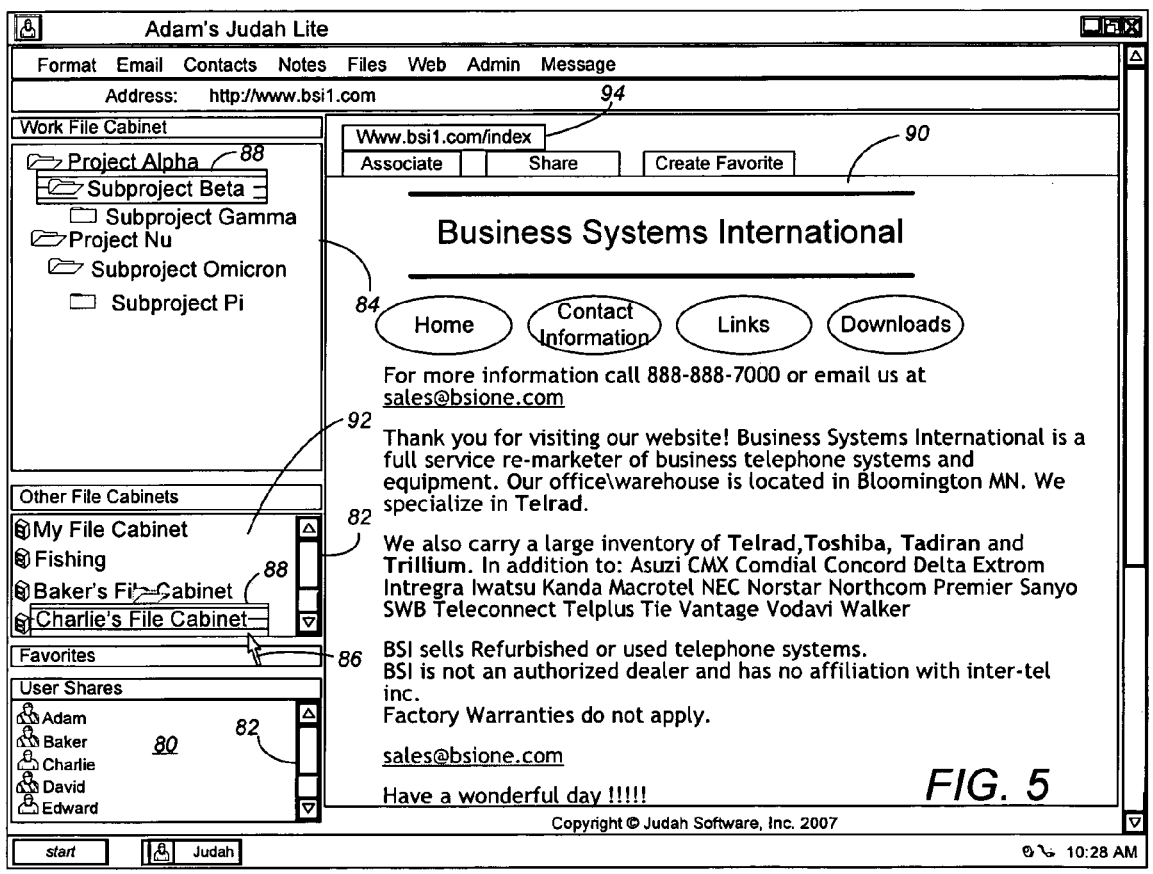
FIG. 5 is a simplified screen shot showing a first user (Adam) sharing a folder with a second user (Charlie).

Thus Adam can, for instance, with a single mouse command, associate the entire contents of Subproject Beta into Charlie's File Cabinet. FIG. 5 reflects this example, showing Adam's GUI 78 while creating the new association for Subproject Beta. This click-drag-drop command results in a new association created in the Folder/Children Association Table 36, namely:

| Key | File Cab/Folder ID | Child ID | Index | OLF |
|-----|---------------------|----------|-------|-----|
| 89152 | FC12 | 2 | 1 | 0 |

Figure 6:
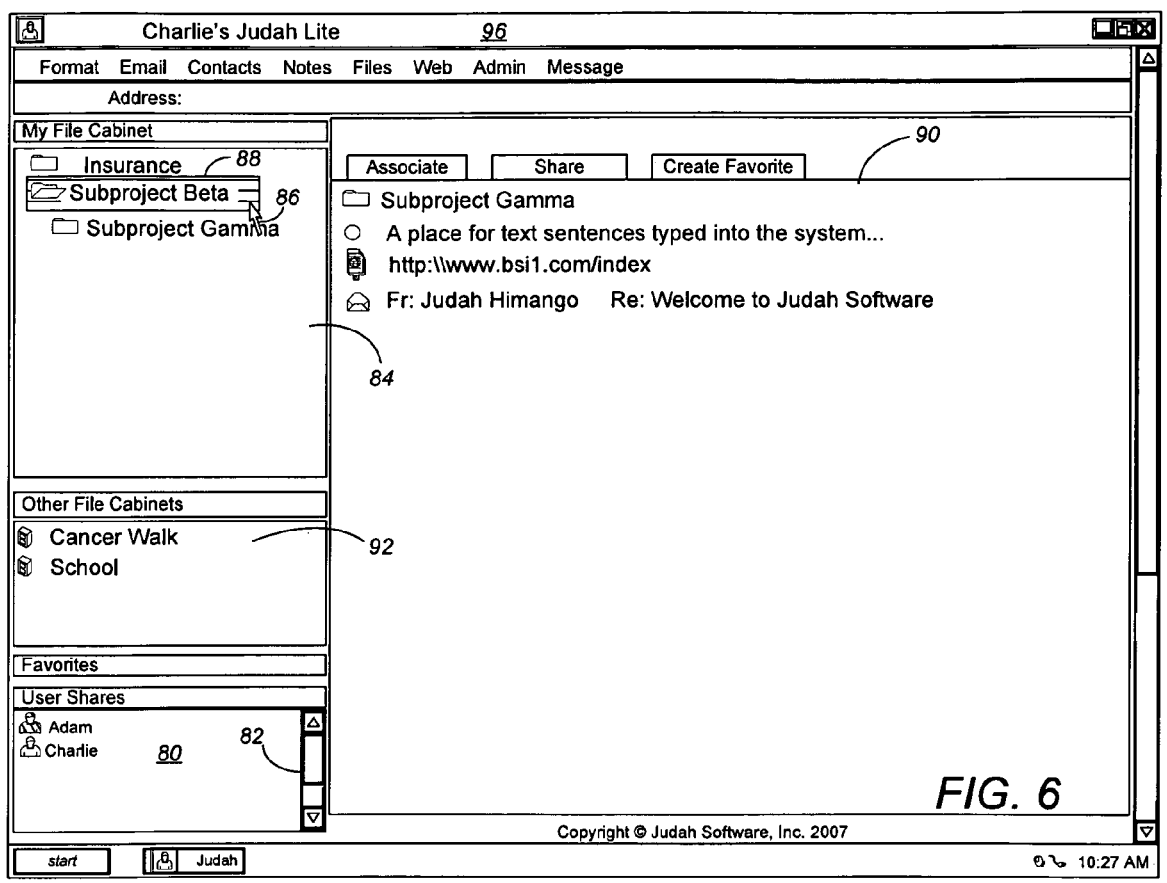
FIG. 6 is a simplified screen shot of a second user (Charlie) utilizing the collaboration software of the present invention including the folder shared by the first user (Adam).

This creation of a new association is reflected in FIG. 6, which shows Charlie's GUI 96 as it is immediately shown on Charlie's viewer, if he is already signed on, or later when Charlie signs on and views the contents of Charlie's File Cabinet. None of folders or items within Subproject Beta are replicated or changed by this new association. Charlie does not have access to the Work File Cabinet, Project Alpha or Project Nu or its contents, as those all exist in the hierarchical structure at a higher lever than Subproject Beta. By giving Charlie access to Subproject Beta through an association, Adam has given Charlie rights to make changes to Subproject Beta and all of the folders and content data items within Subproject Beta. Since only a single version of the three content data items in Subproject Beta exists in the Items List 24 and only a single version of the Subproject Gamma Folder exists in the Folders List 30, all users having access to these items and folders share a completely synchronized version. Once in Charlie's File Cabinet, the upstream hierarchical organizational structure for Subproject Beta in Charlie's File Cabinet is separate from the upstream hierarchical organizational structure in the Work File Cabinet. Charlie can change the location of Subproject Beta within Charlie's File Cabinet without changing the location of Subproject Beta in the Project Alpha folder in the Work File Cabinet.

This example has Adam placing the Subproject Beta into Charlie's File Cabinet as a first level folder, i.e., with Subproject Beta being a direct child of Charlie's File Cabinet. If Adam alternatively wants to place Subproject Beta into a folder lower within the hierarchical structure of Charlie's File Cabinet, Adam can open Charlie's File Cabinet in the second window 84 and click-drag-drop to the desired folder.

Alternatively to using the default click-drag-drop command to create a single new association, Adam could decide to provide Charlie with access to a set of original content data items in the hierarchical structure, with a separate hierarchical structure that Charlie can change without changing the hierarchical structure being used by Adam. To do so via the quickest command, Adam clicks on the desired folder, in this case the Subproject Beta folder, and then drags and drops the folder icon onto "Charlie" in the User Shares window 80. This action results in a new "incoming share" to Charlie, which affects the Sharing lists 76 shown in FIG. 2. In the preferred embodiment, the Sharing lists 76 include an Incoming Share list 102, a Share list 104, and a Share Entry list 106. The preferred Incoming Share list 102 includes fields for Incoming Shares, Recipients, OID and OLF. The preferred Share list 104 includes fields for ID, Sender, Owner and GCRecord. The preferred Share Entry list 106 is linked into the Entry list 64 and contains fields of Entries, Shares, OID and OLF. In general terms, an "incoming share" is initially stored in the system 16 as a new record in the Incoming Shares list 102, alerting the share recipient that another user is sharing information. The share recipient can the view the shared content and decide whether to place the shared information into a location within a file cabinet to which the share recipient has access. In general terms, if Charlie decides to keep the share of Subproject Beta, then the server-side software searches the various association tables and lists (other than the Items List 24) and makes a new copy of all records falling within Subproject Beta. Thus, in our example this click-drag-drop command results in:

a) the following new records created in the Folders List 30:

| Folder ID | Folder Value |
|-----------|--------------|
| 351 | Subproject Beta |
| 352 | Subproject Gamma | b) the following new associations created in the Folder/Children Association Table 36:

| Key | File Cab/Folder ID | Child ID | Index | OLF |
|-----|---------------------|----------|-------|-----|
| 93152 | FC12 | 351 | 1 | 0 |
| 93153 | 351 | 352 | 0 | 0 | and c) the following new associations in the created in the Items/Folder Association Table 34:

| Key | Folder ID | Item ID | Index | OLF |
|-----|-----------|---------|-------|-----|
| 93154 | 351 | 1 | 0 | 0 |
| 93155 | 351 | 2 | 1 | 0 |
| 95156 | 351 | 3 | 2 | 0 |
| 95157 | 352 | 57214 | 0 | 0 |
| 95158 | 352 | 57218 | 1 | 0 |

The hierarchical organization is replicated, but none of the underlying content data for any item is replicated or changed. Once these new associations and folders are made, the entire hierarchical organizational structure for Subproject Beta in Charlie's Share list 104 is separate from the hierarchical organizational structure for Subproject Beta in the Project Alpha folder in the Work File Cabinet. Charlie can change the location of Subproject Gamma, can rename Subproject Beta, etc. and place any of these folders or items within Charlie's File Cabinet without having any effect on the hierarchical folder structure in the Work File Cabinet.

Because all the information displayed on the three left hand organizational windows 80, 84, 92 is determined entirely from the association tables (possibly also including folder and file cabinet name values linked from the Text Items list 24E and user name values from the Users list 26), changing, copying or moving any of the items in the left hand windows 80, 84, 92 through either type of command only changes or adds to the association tables, and the underlying data is unaffected. In contrast, the highlighted item is displayed in the right hand primary viewing window 90. Any user with access to an item (due to the fact that that item is associated with a folder which is in turn associated with a file cabinet to which that user has access) can change the underlying item. For instance, Charlie can click on the text item to highlight it, and then make changes to the text item. In making those changes, because only a single version of the underlying item is stored in the Items List 24, those changes are immediately synchronized and reflected for every other user who accesses the item.

Finally, if desired Adam could make a complete copy of the entire contents of a folder such as Subproject Beta and provide it to Charlie such as in Charlie's File Cabinet. In addition to all the folder and association copies detailed above, a complete copy command copies the associated items as well. If the Items List 24 contains file pointers or file names, a complete copy command will require copying the underlying data and providing new names for the files, such as a new name for file item 57214, c:\petersmug.jpg. Now Charlie can make changes to the underlying files as well as the entire hierarchical folder structure, without in any way affecting the original items or hierarchical folder structure in the Work File Cabinet.

The database driven nature of the collaboration software is reflected when a user signs on. As the software is loaded, the user's computer 12 communicates with the server 22 as part of the sign-in procedure. The information populating the windows 80, 84, 92 on the left hand side of the user's computer 12 is all generated via the association tables and transmission of data through TCP/IP from the server 22 to the user's computer 12.

The real time synchronization of the present invention is further achieved in the way the server 22 communicates changes to all users who are signed on at any given time. Namely, when a user (Charlie, for example) makes a change to the underlying text item or to the hierarchical folder structure, that change is transmitted as a primary change message 108 from Charlie's computer 12c to the server 22. Not only does the server 22 change the underlying text item in the Items List 24 responsive to the primary change message 108, but the server 22 also sends a change advice message 110 to every other user signed on the system 16. Similarly, when Charlie makes a change to any folder, that change is transmitted as a primary change message 108 to the server 22. The server 22 makes the association table and/or database changes, and then sends a change advice message 110 to every other user signed on the system 16, identifying which changes were made to either the File Cabinet List 28, the Folders List 30, the Items/Folder Association Table 34, and/or the Folder/Children Association Table 36. For those users who are viewing the information changed as part of their GUI 78, Charlie's change is immediately made on their screen, i.e., so Adam's screen, for instance, is immediately synchronized due to the change made by Charlie. For those users who have no access to the information changed, the change advice message 110 is simply ignored. If two users simultaneously attempt to make changes to the data or folder structures, the system can employ standard race condition strategies to determine which user's change to implement and to ensure that changes are made in the proper order. As an alternative to sending a change advice message 110 to all other logged on users, the server 22 can keep a log of information which has been transmitted to the local cache of each particular user, and only send messages to those users whose local cache is affected by the change. For instance, changes to Subproject Beta would then not be transmitted to users who had no access to Subproject Beta, and would not be transmitted to users who had not opened Project Alpha.

Such messages 108, 110 are preferably transmitted in TCP/IP format so as to be readily transmitted not only within the local group but also to any users communicating with the system 16 over the internet 18. Each message 108, 110 identifies which item has been changed in the lists and/or the association tables (usually by first reciting the ID or key of the changed item), and what the specific change was. That is, the message 108, 110 does not contain the entire data for the content data items affected, but only the specific change that was made. The GUI 78, 96 of each user having the folder or content data item open or displayed immediately reflects the change.

From this description of the collaboration software, several logical rules of the preferred system 16 can be set out as follows:

1. Each user is associated with at least one file cabinet, but can also be associated or linked with other file cabinets.
2. Folders exist only within file cabinets, but the same folder can appear in more than one file cabinet.
3. Folders can contain other folders or items.
4. Items exist only within folders, but the same item can appear in more than one folder.
5. Through a simple command, folders can be moved or associated to any other folder, to any other file cabinet or to any other user, but no folder is permitted to be associated within itself.
6. Through a simple command, items can be moved or shown as an association in any other folder, or moved or shown as an association to any other user, without modification of the underlying item. A separate command permits copying of the underlying data.
7. Because items, folders and file cabinets are defined each in a database, changes to any item name, to any folder name and to any file cabinet name will be reflected upon all viewing of that item name/folder/file cabinet by any user.
8. Because the location of folders is defined in a hierarchical tree structure through the Folder/Children Association Table 36, the default moving or copying of any folder will move or copy the entire embedded folder or item structure, but will not move or copy the underlying items.
9. For intuitive ease of use, naming, moving, associating of name or copying of file cabinets, folders or items occurs as an HTML mouse command.

An additional feature of the collaboration software can be provided by defining groups of users. The definition of user groups occurs in many organizations. Just as users, file cabinets and folders can be established using a simple list together with an association table, the relationships between users and groups can be defined in much the same way. For example, Table VIII below shows an example of a group list.

TABLE VIII

Group List

| Group ID | Group Value |
|---|---|
| 1 | Administration |
| 2 | Engineering |
| 3 | Human Resources |
| * * * | * * * |
| 7 | Programming |
| * * * | * * * |
| n | Name value for group n |

Once groups are defined, a User/Group Association Table can be used to tie any user into one or more groups. Table IX below shows an example, wherein Adam (user ID #1) is in both the Administration and Engineering groups, while Baker (user ID #2) and Charlie (user ID #3) are in the Engineering group.

TABLE IX

| | User/Group Association Table | | | |
|---|---|---|---|---|
| Key | Group ID | User ID | Index | OLF |
| 93158 | 1 | 1 | 0 | 0 |
| 93159 | 2 | 1 | 0 | 0 |
| 95180 | 2 | 2 | 1 | 0 |
| 95181 | 2 | 3 | 2 | 0 |
| * * * | * * * | * * * | * * * | * * * |

Thus, in the preferred schematic of FIG. 2, the Grouping databases 74 include a Workgroup list 112 and a User/Group Association Table 114. The preferred Workgroup list 112 is linked through to the Text Item list 24E, and simply includes an ID field. The preferred User/Group Association Table 114 includes fields of ID, User, Workgroup and IsManager.

Once both the Groups and the User/Group associations are defined, groups can be listed in a window such as in the User Shares window 80 or another window dedicated for showing groups. Then any of the name changing, name replication, creating new associations, moving, or copying commands on any item, folder or file cabinet can be provided to any entire group through a simple mouse command.

As an alternative to providing a separate File Cabinet List 28 and Folders List 30, a single folder list can be established with certain folders set up as the highest level hierarchy. Table X below shows an example of this, providing equivalent folders to represent both the file cabinets of Table III and the folders of Table IV.

TABLE X

| File Cabinet/Folder List B | |
|---|---|
| Folder ID | Folder Value |
| 1 | [User 1] My File Cabinet |
| 2 | Project Alpha |
| 3 | Subproject Beta |
| 4 | Lake Huron Trip |
| * * * | * * * |
| 35 | [User 3] My File Cabinet |
| * * * | * * * |
| 45 | Project Nu |
| * * * | * * * |
| n | Name value for folder n |

With no file cabinets, the User/File Cabinet Association Table 32 and the Folder/Child Association Table would need to be modified to handle only folders, but the equivalent hierarchical structure and associations can be set up. The file cabinet level of organization can thus be seen as merely a simple logical implementation to make the proper associations between the individual users and the highest level of organizational structure used in the collaboration software.

Figure 7:
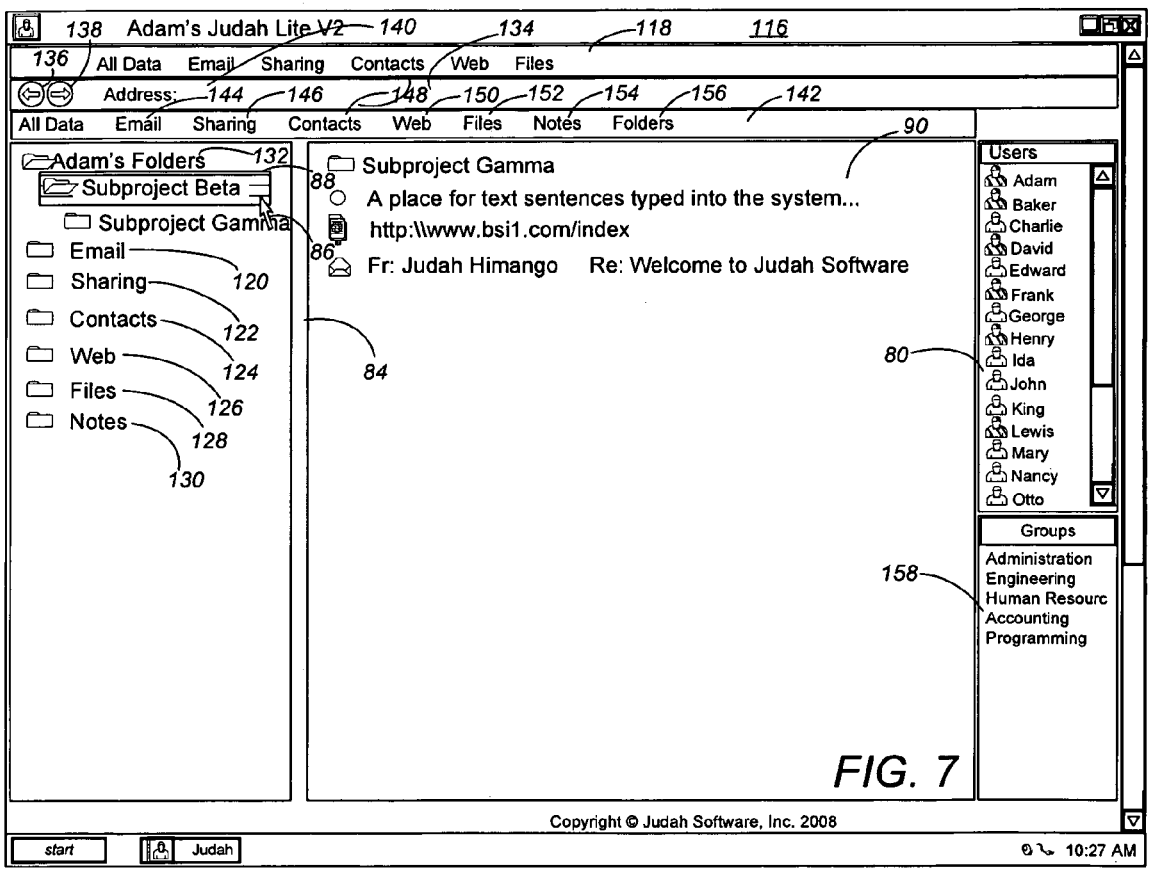
FIG. 7 is a simplified screen shot of an alternative graphical user interface utilizing the present invention.

An alternative graphical user interface 116 for an alternative version of collaboration software in accordance with the present invention is shown in FIG. 7. This graphical user interface 116 includes a command line 118 which is modified to show command entries of "All Data", "Email", "Sharing", "Contacts", "Web", "Files", "Notes" and "Folders". This version of the collaboration software does not utilize File Cabinets, but rather uses only folders to create the entire hierarchical structure. Each user is initially set up with default folders entitled "Email", "Sharing", "Contacts", "Web", "Files" and "Notes". For each of these five types of content data items, content data items are by default filed into their respective folders in accordance with the type of content data item created or received. Thus, incoming and outgoing emails are by default placed into the "Email" folder 120. Items (regardless of the type) or Folders (regardless of the contents) that are received or sent via a Sharing command in the collaboration software to other users are by default placed into the "Sharing" folder 122. Contacts items which are created by the user are by default placed into the "Contacts" folder 124. URLs or favorites that are saved when the user is surfing the web are by default saved into the Web folder 126. Files that are created in other programs are by default placed in the "Files" folder 128. Text Items created by a user are by default placed in the "Notes" folder 130. These six default folders, 120, 122, 124, 126, 128, 130, with content data items retained therein by default, provide a useful starting point for organization of content data items, particularly for the numerous content data items which are not naturally stored into a folder created by the user.

With this default folder placement structure, content data items are automatically and by default placed into a folder 120, 122, 124, 126, 128, 130 by the collaboration software when created or received. That is, the user is not required to place content data items into any topical folder. A "Folders" folder 132 is available for all the topical folder organization that the user desires. For instance, the user (Adam) could create all of the topical folders such as the topical folders and file cabinets in the earlier examples and shown in Tables III and IV, including folders entitled "Work", "Fishing", "Cancer Walk", "Project Alpha", "Subproject Beta", "Subproject Gamma", "Project Nu", "Subproject Omicron", "Subproject Pi", etc. Adam may then place content data items into any of these topical folders in the hierarchical structure, and any other user having access to such a topical folder also has immediate access to all of the folders and content data items contained therein. With a simple mouse command, content data items can be associated into a topical folder, or with a different mouse command content data items may be fully moved from a default folder to a topical folder. However, none of the six default folders 120, 122, 124, 126, 128, 130 can be deleted or fully moved into a topical folder.

An address command line 134 is shown which can be used as known in the art, such as including a "forward" button 136, a "backwards" button 138, and an "Address" field 140 for web surfing.

A filter command line 142 is also added toward the top of the view 116. For instance, by highlighting the Email filter 144, the user can view only the Email content data items which are stored in any particular folder. "Sharing", "Contacts", "Web", "Files", "Notes" filters 146, 148, 150, 152, 154 can be similarly highlighted to display only content data items of that particular type. A "Folders" filter 156 is used to display only the hierarchical folder structure and no content data items.

The graphical user interface 116 of FIG. 7 has a main item window 90. The graphical user interface of FIG. 7 then has a Users' Window 80 and a Groups' Window 158 placed by default on the right hand side of the graphical user interface 116. Other users and groups are listed in the Users' Window 80 and the Groups' Window 158 to receive folders or items shared by a user.

Although the present invention has been described with reference to preferred embodiments, workers skilled in the art will recognize that changes may be made in form and detail without departing from the spirit and scope of the invention. In particular, the default folder and placement structure, coupled with the topical hierarchical folder structure, shows just one of numerous ways in which the graphical user interface and various attributes of the present invention can be powerfully used. Workers skilled in the art will appreciate that the backbone concepts of the present invention can be equally and powerfully applied in a myriad of different ways.

The invention claimed is:

1. A computer system for storage, sharing and synchronization of data between a plurality of users, comprising:
   a plurality of content data items electronically stored on a non-transitory, tangible computer readable storage medium in a central memory;
   a plurality of electronic folders stored in the central memory, each folder being configured to contain content data items and/or contain child folders in a multi-level hierarchical structure;
   associations stored in the central memory, the associations placing each of the plurality of content data items into at least one folder, wherein each content data item of the content data items may be associated directly into each of the plurality of folders;
   a server logically programmed for accessing the central memory and providing selected access to the plurality of folders and the content data items associated in the plurality of folders; and
   a viewer on each of a plurality of peripheral computers, each viewer providing user identification information identifying a user to the server;
   wherein the server, using the user identification information, provides viewer access to folders and to content data items in the multi-level hierarchical structure falling within at least one top level folder with access granted to that user, wherein multiple users can have simultaneous, synchronized access to a same folder, and such that new associations for existing folders or existing content data items can newly grant access to existing content data items for additional users;
   wherein any user with access to a content data item can change a content of that content data item;
   wherein any user can change parts of the multi-level hierarchical structure to which that user has access;
   wherein changes made by an initiating user to a content data item or to a part of the multi-level hierarchical structure are transmitted as a primary change message from a viewer of the initiating user to the server;
   wherein the server acts automatically on the primary change message by changing the content data item the initiating user made changes to, the associations, and/or the multi-level hierarchical structure in accordance with the primary change message;
   wherein the server sends a change advice message to all users logged on to the system and with access to the changed content data item or the changed part of the multi-level hierarchical structure, the change advice message notifying the users logged on to the system that the change has been made; and
   wherein each primary change message and each change advice message identifies which content data item or part of the multi-level hierarchical structure has been changed and what the specific change was without containing the entire data for the changed content data item or the entire multi-level hierarchical structure.

2. The computer system of claim 1, wherein primary change messages are transmitted from each viewer to the server through TCP/IP formatted messages.

3. The computer system of claim 1, wherein change advice messages are transmitted from the server to viewers of other users through TCP/IP formatted messages.

4. The computer system of claim 1, wherein an association identifying at least one folder to which a content data item belongs exists in an items/folder association table, and wherein a value of content data associated with items in the items/folder association table exists in a separate datastructure.

5. The computer system of claim 1, wherein a user on each viewer can author new items of content data thereby creating new content data items, wherein the new content data items are transmitted from each viewer to the server.

6. The computer system of claim 5, wherein the server transmits new content data items to non-authoring users via TCP/IP formatted messages.

7. The computer system of claim 1, wherein content data associated with a content data item is a text item.

8. The computer system of claim 1, wherein content data associated with a content data item is an e-mail message.

9. The computer system of claim 1, wherein content data associated with a content data item is a URL.

10. The computer system of claim 1, wherein content data associated with a content data item is a file or file address.

11. The computer system of claim 1, wherein content data associated with a content data item is a contact item.

12. The computer system of claim 1, wherein content data associated with different content data items comprises:
   an e-mail message for at least one content data item;
   a URL for at least one content data item; and
   a file or file address for at least one content data item;
   and further comprising a field identifying a type of content data information associated with each content data item.

13. The computer system of claim 1, wherein the plurality of electronic folders comprise default folders based on content data item type, wherein a first association is automatically made for each of the plurality of content data items into a default folder, and wherein a viewer can create an additional association for a content data item through a mouse command.

14. The computer system of claim 13, wherein the mouse command is by default a single left click-drag-drop.

15. The computer system of claim 1, wherein each folder may be associated into a plurality of other folders but cannot be associated into itself.

16. A computer system for storage, sharing and synchronization of data between a plurality of users, comprising:
   a non-transitory, tangible, computer-readable storage medium storing, in a database, an association table of records, each record including a field identifying at least one folder of a plurality of folders to which a content data item associated with that record belongs, wherein each record may belong to the plurality of folders, with all the folders arranged in a multi-level hierarchical structure;
   a server providing access to selected records of the database; and
   a viewer on each of a plurality of computers, each viewer containing user identification information identifying a user to the server;
   wherein the server, using the user identification information, provides viewer access to the folders and to content data items in the multi-level hierarchical structure falling within at least one to level folder with access granted to the user identified by the identification information, wherein multiple users can have simultaneous synchronized access to a same folder, and such that new associations for existing folders or existing content data items can newly grant access to existing content data items for additional users;
   wherein the server, using the user identification information, permits any user with access to a content data item to change a content of that content data item and permits any user with access to a part of the multi-level hierarchical structure to make changes to that part of the multi-level hierarchical structure in the stored database;

wherein changes made by an initiating user to a content data item or to a part of the multi-level hierarchical structure are transmitted as a primary change message from a viewer of the initiating user to the server;

wherein the server acts automatically on the primary change message by changing the content data item the initiating user made changes to and/or the association table in accordance with the primary change message;

wherein the server transmits the changes made as a change advice message to other viewers logged on to the system and with access to the changed content data item or the changed part of the multi-level hierarchical structure through a TCP/IP message notifying the other viewers the change having been made; and wherein each primary change message and each change advice message identifies which content data item or part of the multi-level hierarchical structure has been changed and what the specific change was without containing the entire data for the changed content data item or the entire multi-level hierarchical structure.

17. The computer system of claim 16, wherein primary change messages are transmitted from each viewer to the server through TCP/IP formatted messages.

18. A client-side application having computer instructions recorded on a non-transitory, tangible computer readable storage medium providing a graphical user interface, the graphical user interface comprising at least one window wherein folders and content data items are listed in a hierarchical format;

wherein each content date item of the content data items may be associated directly into each of the folders;

wherein multiple users may have simultaneous, synchronized access to a same folder;

wherein a new association for any listed folder or content data item can be made by selecting the listed folder or content data item with a mouse command, the new association additionally placing the selected folder or content data item within the client-side application at a different location in the hierarchical format, such that new associations for existing folders or existing content data items can newly grant access to existing content data items for additional users;

wherein any user with access to a content data item can change a content of that content data item and wherein any user can change parts of the hierarchical format to which that user has access;

wherein the client-side application records any new associations and any changes as a primary change message transmitted from the client-side application to a server through a TCP/IP format;

wherein the client-side application can receive change advice messages from the server identifying which content data item or part of the hierarchical format has been changed by a different user and what the specific change was only when the user is logged on to the server and only when the user has access to the changed content data item or the changed part of the hierarchical format;

wherein, upon receipt of the change advice message regarding any content data item or part of the hierarchical format to which that client-side application has access, the client-side application immediately and automatically displays the change to the content data item or part of the hierarchical format being displayed by the graphical user interface; and wherein each primary change message and each change advice message identifies which content data item or part of the hierarchical format has been changed and what the specific change was without containing the entire data for the changed content data item or the entire hierarchical format.

19. The client-side application of claim 18, wherein the client-side application can receive change advice messages transmitted by the server through a TCP/IP format, wherein the client-side application immediately shows the change on the graphical user interface upon receipt of a change advice message.

20. A computer system for storing, sharing and synchronizing data between a plurality of users, comprising:

a plurality of computer-readable content data items electronically stored in a non-transitory, tangible central memory;

a users list electronically stored in the central memory comprising a list of users;

a content data item list electronically stored in the central memory comprising a list of data items;

a folder list electronically stored in the central memory comprising a list of folders;

a user/folder association table associating each folder in the folder list to a user in the users list, wherein the user/folder association table may associate each folder in the folders list to a plurality of users;

an items/folder association table placing each item in the content data item list into at least one folder in the folder list, the items/folder association table may associate each item in the content data item list directly into each of the plurality of folders in the folder list;

a folder/children association table placing folders from the folder list as selected child folders within selected parent folders in a multi-level hierarchical folder structure; and a server logically programmed for:
  accessing the central memory;
  providing a user with selected user access to the folders in the folder list and the content data items contained in the folders in the multi-level hierarchical folder structure falling within at least one top level folder with access granted to that user via the user/folder association table;
  transmitting content data items, folders, and changes to content data items and folders to a plurality of users and, by an automatic synchronized updating process, automatically updating changes to a content data item and to each of the user/folder association table, the items/folder association table and the folder/children association table;

wherein any user with access to a content data item can change a content of that content data item;

wherein any user can change parts of the hierarchical folder structure to which that user has access;

wherein changes made by an initiating user to a content data item or to a part of the hierarchical folder structure are transmitted as a primary change message from a computer of the initiating user to the server;

wherein the server acts automatically on the primary change message by changing the content data item the initiating user made changes to, the items/folder association table, and/or the folder/children association table in accordance with the primary change message;

wherein the server sends a change advice message to all users logged on to the system and with access to the changed content data item or the changed part of the hierarchical folder structure, the change advice message notifying the users logged onto the system that the change has been made; and wherein each primary change message and each change advice message identifies which content data item or part of the hierarchical folder structure has been changed and what the specific change was without containing the entire data for the changed content data item or the entire hierarchical folder structure.

21. The computer system of claim 20, wherein the content data items in the content data item list are selected from the group consisting of text items, e-mail messages, URLs, files, file addresses, and contact items, and wherein different users can maintain different hierarchical folder structures of folders and/or items to which they have access, the computer system further comprising:

an email address list electronically stored in the central memory, wherein the users in the user list are linked to one or more email addresses in the email address list;

a workgroup list electronically stored in the central memory;

a user/group association table electronically stored in the central memory, the user/group association table linking one or more users in the users list into groups in the workgroup list;

an email managing system for processing emails between users, email addresses and groups;

a readby list electronically stored in the central memory, wherein content data items are linked by the readby list to users in the user list who have opened those content data items;

a sharing system comprising:
a plurality of user sharing entries selectively displayable on viewers of each of a plurality of user computers, each user sharing entry assigned to a different user;

wherein any user with access to a content data item or to a part of the hierarchical folder structure can share selected content data items and/or folders to selected share recipient users via the user sharing entries, resulting in the initiating user's computer transmitting a share notification in TCP/IP format to the server;

wherein the server, upon receipt of the share notification, transmits a share notification message in TCP/IP format to the selected share recipient users;

wherein the selected share recipient users can each access and view the shared content data items and/or folders; and wherein any selected share recipient user may associate the shared content data items and/or folders into any folder or folders to which the selected share recipient user has access, thereby making a new association in the item/folder association table; and a locked folder list electronically stored in the central memory, wherein selected folders may be locked to prevent changes to content data items contained therein, thereby giving different users separate write security to different content data items.

22. The computer system of claim 20, further comprising:
a plurality of user sharing entries selectively displayable on viewers of each of a plurality of user computers, each user sharing entry assigned to a different user;

wherein any user with access to a content data item or to a part of the hierarchical folder structure can share selected content data items and/or folders to selected share recipient users via the user sharing entries, resulting in the initiating user's computer transmitting a share notification to the server;

wherein the server, upon receipt of the share notification, transmits a share notification message to the selected share recipient users;

wherein the selected share recipient users can each access and view the shared content data items and/or folders;

wherein any selected share recipient user may associate the shared content data items and/or folders into any folder or folders to which the selected share recipient user has access, thereby making a new association in the item/folder association table; and wherein different users can maintain different hierarchical folder structures of folders and/or items to which they have access.

23. The computer system of claim 22, wherein the user sharing entries are icons.

* * * * *